July 30, 1957 — H. HORLACHER — 2,800,839
CONTOURING MACHINE
Filed Feb. 4, 1954 — 5 Sheets-Sheet 1

INVENTOR.
HERMAN HORLACHER
BY H. K. Parsons & L. W. Wright
ATTORNEYS.

INVENTOR.
HERMAN HORLACHER
BY
H. K. Parsons & C. W. Wright
ATTORNEYS.

INVENTOR.
HERMAN HORLACHER
BY
H. H. Parsons & L. W. Wright
ATTORNEYS.

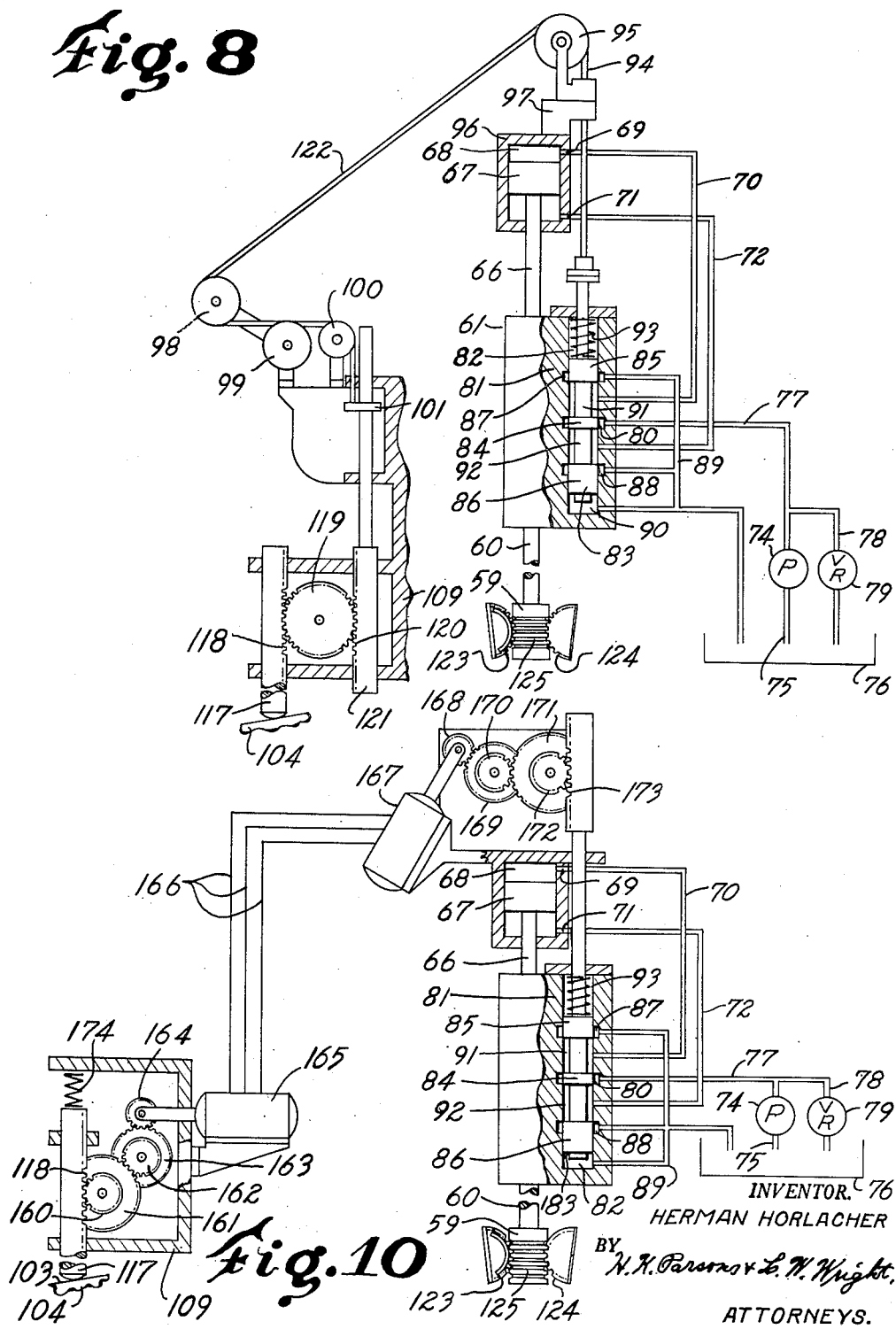

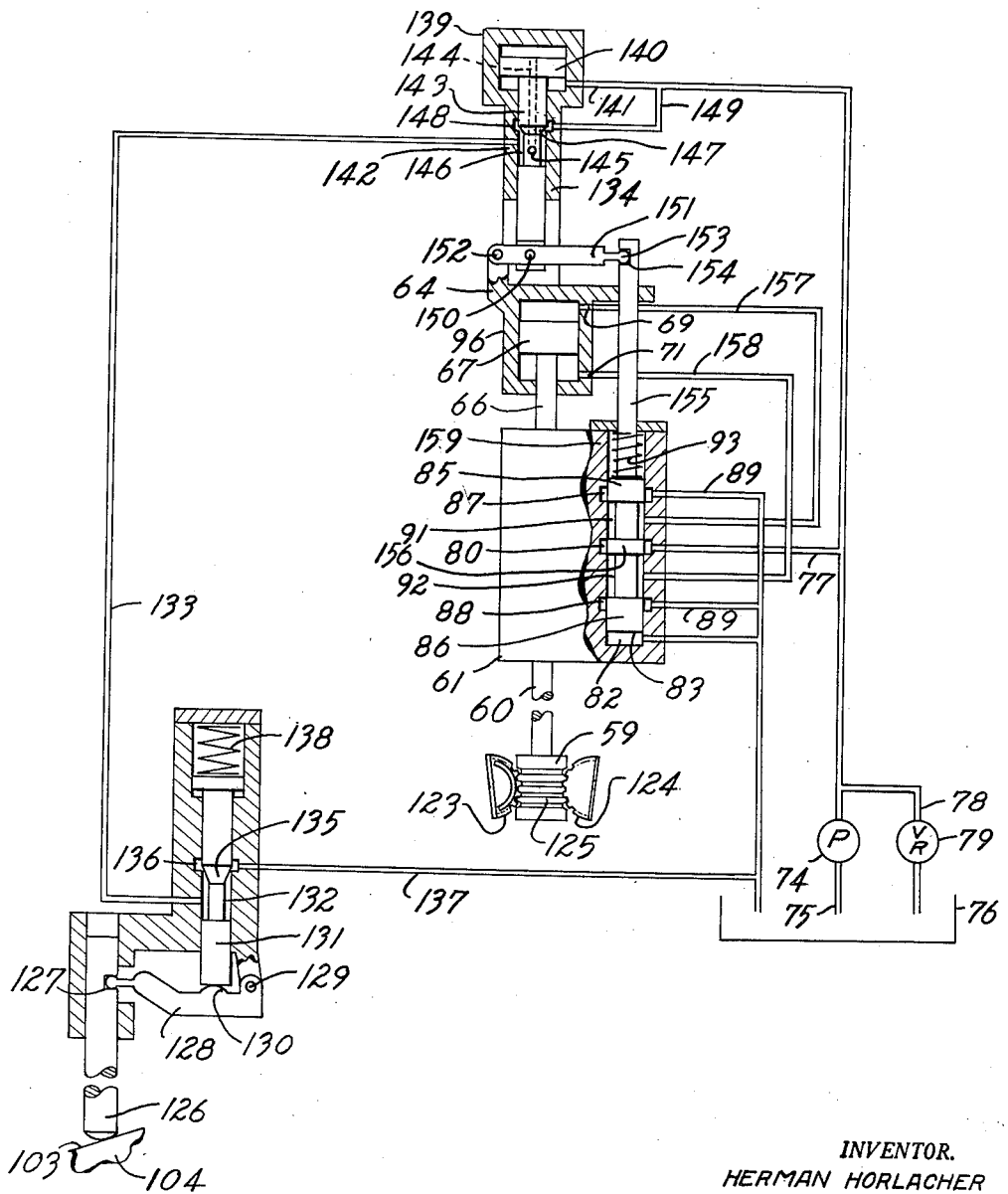

United States Patent Office 2,800,839
Patented July 30, 1957

2,800,839
CONTOURING MACHINE

Herman Horlacher, Cincinnati, Ohio, assignor to The Cincinnati Milling Machine Co., Cincinnati, Ohio, a corporation of Ohio Application February 4, 1954, Serial No. 408,122

10 Claims. (Cl. 90—13.5)

This invention relates to improvements in contouring machines and has particular reference to an improved machine for pattern reproduction of variable contoured surfaces on a work piece.

One of the objects of the present invention is the provision of an improved automatic machine capable of producing a variable angle or contoured wall on a work piece during the contoured or profiled outlining of the work piece.

A further object of the invention is the provision of an improved cutter and control mechanism therefor capable of utilization with existing contouring or profiling machines which will adapt such machines for the production of variable angle walls on a work piece during the performance of a 360 degree or like profiling or contouring operation.

Another object of the invention is the provision in connection with a variable angle cutter structure, of improved pattern and tracer mechanism for effecting automatic variation in the cutter angle during the travel of the cutter in performance of a machining operation.

An additional object of the present invention is the provision of an improved cutter structure and controls therefor of a nature permitting ready and accurate variation in the effective configuration of the cutter during a machining operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 8 is a similar view of a modified form of tracer.

Figure 9 is a diagrammatic view of an alternative hydraulic circuit utilizable for tracer control of cutter blade positioning.

Figure 10 is a corresponding view illustrating the employment of Selsyn mechanism for transmission of movement from the pattern actuated tracer to the hydraulic control for the cutter blades.

Figures 1, 11, 12, 13:
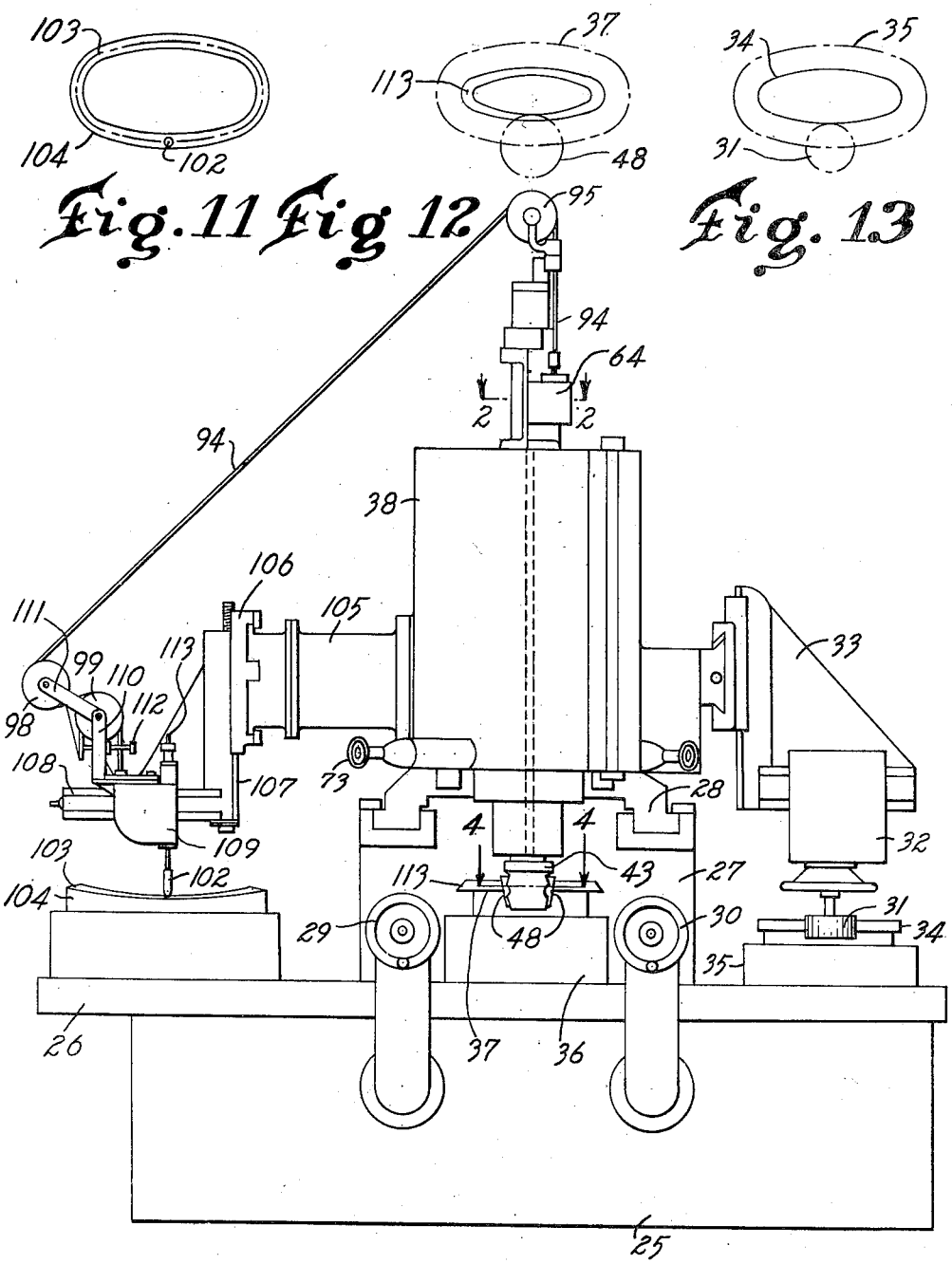
Figure 1 is a front elevation of a machine embodying the present invention.
Figure 11 is a plan view of the left hand or cutter angle control pattern as utilized in connection with the machine shown in Figure 1.
Figure 12 is a corresponding view of a shaped work piece.
Figure 13 is a plan view of the contour or outline determining pattern.
Figure 3:
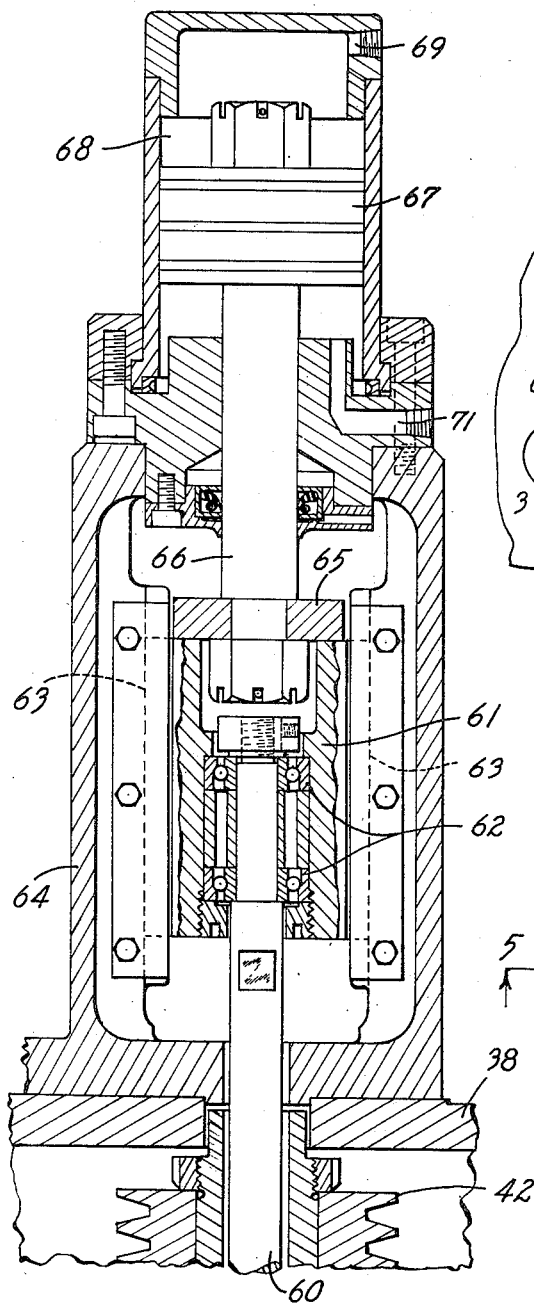
Figure 3 is a fragmentary vertical sectional view on the line 3—3 of Figure 2.
Figure 2:
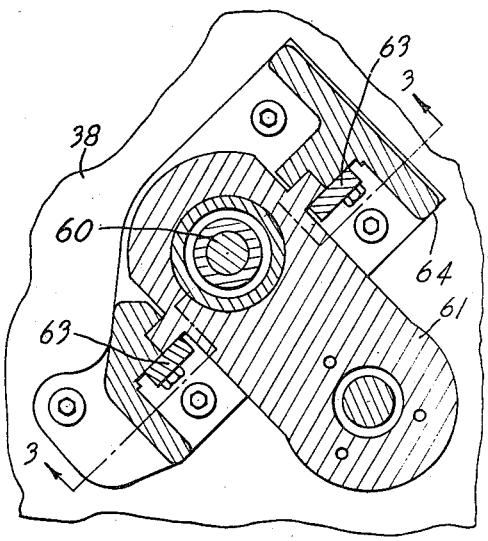
Figure 2 is a transverse section on the line 2—2 of Figure 1.
Figure 4:
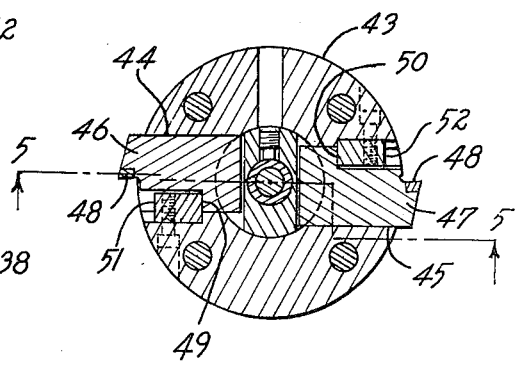
Figure 4 is a transverse section of the cutter as on the line 4—4 of Figure 1.

In the drawings the invention has been illustrated as utilized in what is commercially known as a "Hydrotel" automatic contouring machine of the general character illustrated in United States Letters Patent 2,068,889 provided with a suitable 360 degree automatic contour controlling structure, a characteristic example of which is shown and described in detail in United States Letters Patent 2,332,533. Such machines embody, for example, the bed 25 supporting the longitudinally movable table 26, and have a column portion 27 supporting ram 28 for in and out movement or movement in a direction transversely to the direction of movement of the table. These movements may be effected either manually by the control wheels 29 and 30 or automatically under control of tracer 31 carried by the tracer head 32 supported from the ram by a bracket 33. The tracer 31 is adapted to engage and follow the outline 34 of the contour controlling pattern 35 which is mounted on one end of the table 26. Carried by the table is fixture 36 supporting the work piece 37.

Supported on the ram for vertical movement is the spindle carrier head 38, vertically adjustable by the hand wheels 73 and rotatably supporting the cutter spindle 39 having at its lower end the tapered socket 40. This spindle is rotatably mounted within the head 38 and provided with the pulley sheave 42 adapted to be driven by suitable motive force such as a motor, not shown, contained within the head for effecting power rotation of the cutter.

Figure 5:
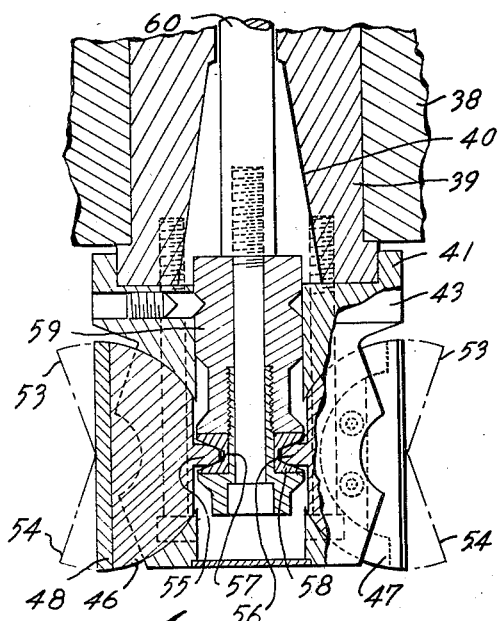
Figure 5 is a fragmentary vertical section through the cutter on the line 5—5 of Figure 4.
Figure 6:
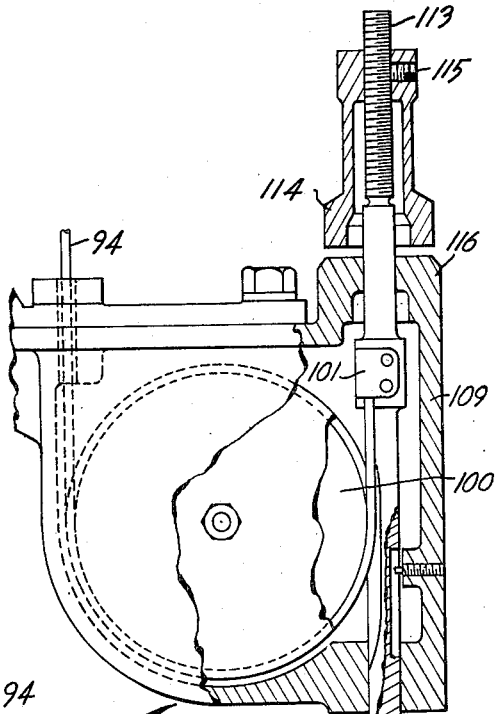
Figure 6 is a fragmentary enlarged view, partially in section of one form of control tracer.

As illustrated, the cutter comprises a cutter body 43, having a flange 41 secured to the spindle 39 and slotted as at 44 and 45 to receive the arcuate shaped body portions of the cutter blades 46 and 47, which are preferably provided with carbide or like hardened cutting edges 48. These blades have arcuate ribs 49 and 50 secured for rocking movement in the slots 44 and 45 of the body 43 by the guide plates 51 and 52. The mounting of the blades is such that they may be rocked or oscillated from full line position parallel with the spindle axis as shown in Figure 5, either outwardly at their upper ends as indicated by the dotted lines 53 in Figure 5, or inwardly at their upper ends and outwardly at their lower ends as indicated by the dotted lines at 54 in said figure.

To control such rocking movement, the blades are inwardly provided with the lugs 55 and 56 engaged in the peripheral groove 57 of the shifter 58 secured to sleeve or plunger 59 which has a sliding fit in the bore of the cutter body 43. This plunger 59 is mounted on the operating rod 60 which has its upper end rotatably but non-translatably mounted in the slide 61 by anti-friction bearings 62. Slide 61 is supported for vertical movement by the ways 63 of the bracket 64 secured on the upper face of the main spindle carrier 38. Secured to the cross head 65 of slide 61 is a piston rod 66 bearing on its upper end piston 67 having limited vertical movement in the cylinder 68 carried by the bracket 64. Cylinder 68 has a port 69 at its upper end above the piston 67 to which is connected the hydraulic conduit 70. The second port 71 extends into the lower portion of cylinder 68 and has connected thereto the hydraulic conduit 72.

The conduits 70 and 72 act alternatively as inlet or exhaust conduits with respect to the two ends of the cylinder so that the position of the piston 67 may be properly and accurately controlled.

Figure 7:
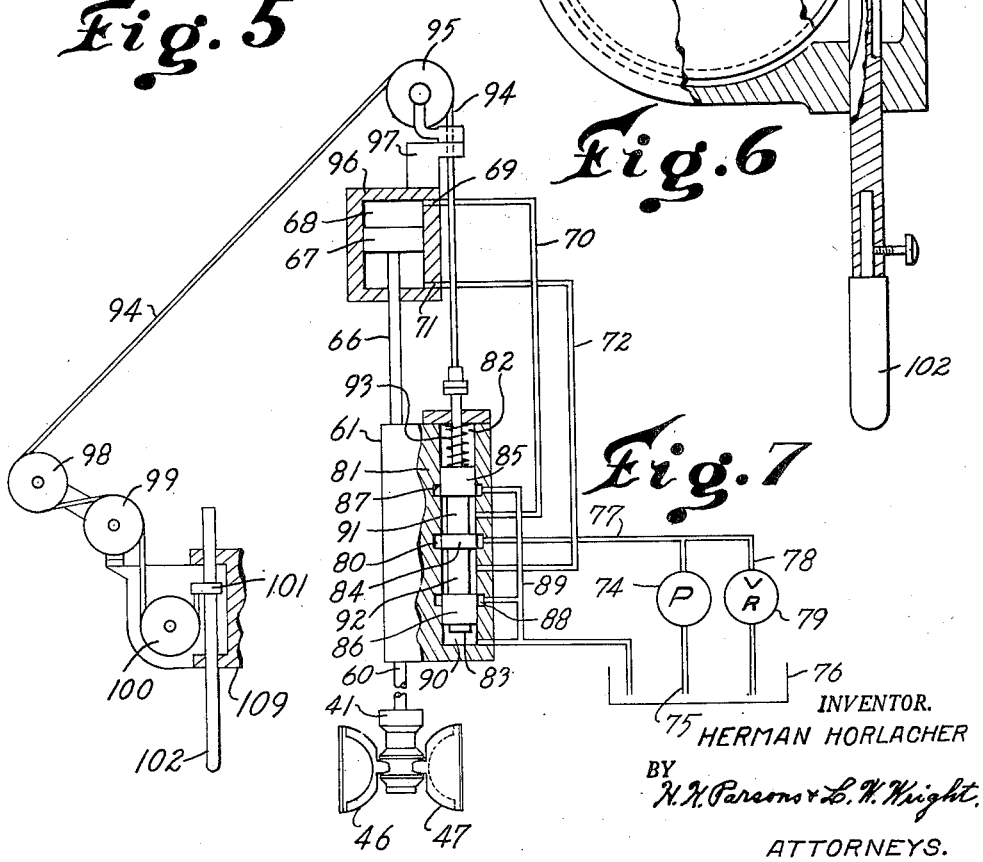
Figure 7 is a diagrammatic view of a simplified form of a tracer and hydraulic actuating circuit utilizable for carrying out the present invention.

One structure for such automatic control of piston is shown in Figure 7. This includes pump 74 having an inlet conduit 75 communicating with the tank or reservoir 76, this pump supplying pressure as of hydraulic actuating medium into the conduit 77, a by-pass conduit 78 containing a variable relief valve 79 determining the existing pressure in conduit 77.

Conduit 77 is coupled with the pressure inlet groove 80 in the valve casing or bushing 81 carried by the slide 61 having a central bore 82 in which is slidably mounted the valve member 83. This valve has a central spool portion 84 normally opposing the groove 80 and the end spool portions 85 and 86 positionable to close off the return grooves 87 and 88. Conduit means 89 serve to couple the grooves 87 and 88 and the drain chamber 90 at the lower end of the bushing with reservoir.

The conduit 70 is ported into the valve bushing 81 at a point opposite the groove 91 of the valve which is intermediate the spool portions 84 and 85, and the conduit 72 is ported into the valve bushing opposite the groove portion 92 of the valve intermediate the spool or shoulder portions 84 and 86.

A spring 93 interposed between the end of bushing and the valve tends to urge the valve in a downward direction while, as shown, a belt or flexible actuating member 94 is coupled to the opposite end of the valve for moving and retaining the same in selected position in opposition to the spring action.

The valve structure thus described provides a servo-type power control in which the member 84 may form either a shut-off of pressure to the cylinder 68 or effect a balanced pressure condition in opposite ends of the cylinder as respects piston 67, stabilizing the location of the piston at a vertical height determined by positionings of valve 83, the movement of the piston and slide 61 effecting a compensatory movement of the bushing 81 to shut off the slide movement.

The flexible connection 94 extends laterally around the pulley or idler 95 supported on the end plate 96 of cylinder 68 by bracket 97 and around the additional adjustable series of idlers 98, 99 and 100. Its terminus is secured by collar 101 to the vertically movable tracer finger 102 which is designed to follow the undulating path 103 on the cutter template or pattern mounted on the support 104 disposed at the left hand end of the translatable work table 26.

The tracer structure is supported from the vertically adjustable spindle carrier head 38 by an arm 105 having ways guiding the cross slide 106, in turn mounting a vertical slide 107 with ways 108 for the tracer head 109. This mounting permits of universal adjustment of the tracer in all directions to properly locate and orient the contact point between tracer and template 103 and the work piece 37. Additionally, the head 109 carries the arm 110 rotatably supporting the idler 99 and the swinging arm 111 which, in turn, rotatably supports the idler 98. An adjusting screw 112 controls the angular relationship between the arms 110 and 111 to maintain the desired tension on the flexible connection 94 and the proper positional relationship between the tracer finger 102 and the valve 83.

As the several parts are all carried by the spindle carrier 38, the height of the cutter and tracer as a unit may be readily vertically adjusted with respect to the table for establishing the desired control relationship.

Alternatively, if the cutter is to be lowered relative to the work for a given position of the pattern 104, readjustment of the position of the control valve with respect to the pattern contacting tracer end 102 may be readily effected by varying the position of the idler 98.

As particularly brought out in Figures 1, 11, 12, and 13, the present invention is especially advantageous for production of a work piece of either regular or irregular peripheral contour in which it is desired that the angle of the bounding wall or surface 113 produced on the work piece varies from point to point, either in a regular or irregular progressive manner. For simplicity of understanding, the work piece has been shown as elliptical in form, the general contour produced being controlled by the shape of the pattern 34 reacting on the 360 degree tracer control structure.

By reference to Figures 1 and 12, it will be noted that in the particular example chosen for purposes of illustration that the wall or side of the finished work is nearly vertical when viewed at its minor axis while having an appreciable upward taper at its major axis. By the present invention, this result may be completely automatically attained in that the rise and fall curve 103 of the pattern is such as to control the vertical displacement of the tracer finger 102 during the 360 degree contouring movement of the cutter and spindle carrier. As will be evident, upward movement of the tracer finger will react through the connection 94 to effect a corresponding upward movement of valve 83, unblocking pressure conduit 77 so that pressure may flow through conduit 72 to react against the underside of piston 67, correspondingly to raise the shifter 58. This upward movement of the shifter from the null or central position shown in Figure 5 effects a counterclockwise oscillation of the left hand cutter blade and a corresponding clockwise oscillation of the right hand cutter blade so that the blades will then occupy a tilted position as indicated by the dotted lines 53—53 of Figure 5.

For limitation of the downward movement of the tracer finger 102 irrespective of any drop in the general level of the pattern track 103 and to control the amount of cutter deflection as when the tracer is moved upward out of engagement with the pattern the stylus 102 may be provided with a threaded upper portion 113 receiving the gage sleeve 114 which, if desired, may be locked in adjusted position by the set screw 115 and which has a base portion for position limiting engagement with the lug 116 at the the top of the tracer head 109.

Figure 8 illustrates a slightly different form of tracer mechanism in which the pattern following stylus 117 is supported for vertical sliding movement in the tracer head 109 and is provided with a rack portion 118 meshing with the idler pinion 119 engaging the rack 120 on the plunger 121. Cable 122, corresponding in operation and effect to the cable or flexible connection 94 of Figure 7, is coupled with valve 83 for controlling its vertical movement. As indicated in this figure, in place of the single lugs or teeth 55 and 56 on the cutter blades the blades have been shown as formed with the arcuate racks 123 and 124 meshing with the rack portion 125 carried by the sleeve or plunger 59.

In Figure 9 there has been illustrated a different form of valve control mechanism utilizing a hydraulic linear translator. In this form of the invention, the pattern following stylus 126 is provided with a notch at 127 to receive one end of the operating lever 128 pivoted to the tracer head at 129. Formed on the lever at a point adjacent the pivot is an abutment lug or seat 130 having, for example, a 1 to 3 movement ratio as respects the movement of the stylus 126. Carried by the tracer head and engaging this lug is the valve member 131 having a pressure inlet area at 132 coupled by flexible conduit 133 with valve bushing 134 carried by the bracket 64. The valve 131 has a tapered throttle portion 135 controlling flow from the area 132 to the exhaust groove 136 and thence to reservoir as through conduit 137. The spring 138 urges the valve into closed position and reacts through the lever 128 to hold the stylus 126 downward into engagement with the pattern surface 103.

Carried by the bracket 64 is the control cylinder 139 in which is slidably mounted the piston 140. Coupled to the lower area of the cylinder below the piston is a pressure conduit 141 which may, if desired, be a branch of the general pressure conduit 77 indicated in Figure 7. A guide bushing portion 142 extends downwardly from the cylinder 139 and slidably receives the piston rod 143 which is secured to piston 140 and is provided with the central bore or pressure passage 144 communicating by a transverse port 145 with the cannelure or groove 146 of the piston rod. This groove is bounded at one side by the taper throttle portion 147 effective variably to control the flow of pressure medium through inlet groove 148 which is coupled by conduit 149 with the pressure conduit 141.

Intermediately pivoted to the lower end of the piston rod 143 at 150 is the valve controlling lever 151 having a short arm pivoted at 152 to the valve bushing unit 134 and having at its opposite end the spherical portion 153 engaged in the notch or recess 154 of valve 155 which corresponds in operation and control action with the valve 83 of Figure 7. This valve has the central control spool 156 and is variably positionable by movements of the lever 151 to determine the pressure and exhaust couplings of the cylinder conduits 157 and 158 with the hydraulic pressure conduit 77 and exhaust conduits 89.

In utilization of this form of the invention the direct mechanical couple provided by the flexible band or connection 94 of Figure 7 is eliminated. Pressure is introduced through 141 in the lower end of the cylinder 139, tending to force the piston upward while at the same time pressure tends to flow by way of 149, 148, 146, 145, 144, to the upper end of the piston, building up a pressure on the larger piston area until the effective pressures above and below the piston 140 balance each other to stabilize the position of the piston. Due to the relative effective length of the two ends of lever 151, the amount of vertical movement of the control valve 155 effected by swinging movement of the lever 151 will be greater than the amount of piston movement and may be in the nature of a 3 to 1 ratio as illustrated.

When the stylus 126 is deflected upwardly it will react on the long arm of the lever 128, imparting a lesser but directionally corresponding movement to the valve 131. This will open the throttle 135, reducing the resistance to flow to reservoir through conduit 133 with resultant pressure drop in the area 146. Piston 140 will move upwardly, opening the throttle at 147 until a new balanced pressure condition is established. The physical amount of movement of the piston will react to swing the lever 151 upward, the relative lengths of the left and right hand portions of the lever causing an amplified movement of the valve 155 corresponding to the amount of vertical adjusting movement desired for the piston 67. The follow-up movement of the servo-valve bushing 159 corresponding to the bushing 81 of Figure 7 and similarly carried by the slide 61 will shut off the cylinder flow when the piston 67 and associated parts have been moved to the proper position to effect desired angular adjustment of the cutter blades.

Figure 10 illustrates a further alternatively employable form of flexible motion transmitting control between the cutter blade angle determining template 103 and the piston 67. In this form of invention use is again made of a vertically movable stylus 117 provided with a rack 118. In this form, however, the rack meshes with the small pinion 160, effecting rotation of the coaxial gear 161, driving the pinion portion 162 of gear 163. The gear 163 drives the pinion 164 of the Selsyn transmitter unit 165 electrically coupled in conventional manner by the wires 166 with a mated Selsyn receiver 167. This second Selsyn has the drive pinion 168 meshing with gear 169 whose pinion 170 drives gear 171 having a pinion portion 172 meshing with rack 173 at the upper end of valve 183 which corresponds to valve 83 of Figure 7. The remaining parts and hydraulic connections are the same as those shown and described in detail in connection with Figure 7. In this form of the invention, the spring 174 reacts directly on the sylus 117 to hold it down against the pattern, and any pattern effected movements of 117 are transmitted through the gear train shown to the transmitting unit 165 of the Selsyn pair by way of the gearing illustrated.

Through the electrical connections 116 a corresponding positional movement to the amount of displacement of the pinion 164 of the transmitting Selsyn is imparted to the pinion 168 of the receiving Selsyn 167. This movement is then transmitted through the amplifier gearing illustrated for positioning of the valve 183, it being understood that the actual physical amount of movement of the valve 183 is determined by the ratio between the gear train intervening the stylus and transmitting Selsyn and the gear train ratio intervening the receiving Selsyn and the valve 183, so that, if desired, a much amplified movement may be imparted to the valve 183 to correspond to the necessary physical movement of piston 67 when appreciable changes in cutter blade angles necessitate such amplified movement.

The result here effected is comparable with the resultant of the lever linkages of Figure 9.

From the foregoing it will be evident that various specific control means may be utilized for determination of the variable angular positioning of the blades of the milling cutter during performance of a contouring operation. In all forms, however, the operation is completely automatically controlled by a template or pattern of such character that as the cutter, under pattern control or otherwise, is shifted through a profiling, contouring or other cutting path, the effective angles of the individual cutter blades are automatically adjusted.

What is claimed is:

1. An automatically adjustable variable contouring milling cutter including a rotatable cutter body, axially extending cutter blades mounted in radial slots in the body for angular adjustment in radial planes relative to said body and tracer actuable means operatively connected to said blades for automatically effecting varying angular adjustment of the cutter blades relative to the body during a cutting operation, said tracer actuable means including a shiftable piston, a cylinder for the piston, a rod connecting the piston and blades, and a servo-valve mechanism connected to the cylinder for determining the rate and direction of actuation of the piston and thereby the angular adjustment of the cutter blades.

2. An automatically adjustable variable contouring milling cutter including a rotatable cutter body, axially extending cutter blades mounted in radial slots in the body for angular adjustment in radial planes relative to said body and tracer actuable means operatively connected to said blades for automatically effecting varying angular adjustment of the cutter blades relative to the body during a cutting operation, said tracer actuable means including a shiftable piston, a cylinder for the piston, a rod connecting the piston and blades, and a servo-valve mechanism connected to the cylinder for determining the rate and direction of actuation of the piston and thereby the angular adjustment of the cutter blades, said servo-valve mechanism comprising a pair of relatively movable parts, one of said parts being supported for movement with the piston, a tracer stylus, and means connecting the stylus with the other of said valve parts for shifting the latter in accordance with movements of the stylus.

3. An automatically adjustable variable contouring milling cutter including a rotatable cutter body, axially extending cutter blades mounted in radial slots in the body for angular adjustment in radial planes relative to said body and tracer actuable means operatively connected to said blades for automatically effecting varying angular adjustment of the cutter blades relative to the body during a cutting operation, said tracer actuable means including a shiftable piston, a cylinder for the piston, a rod connecting the piston and blades, and a servo-valve mechanism connected to the cylinder for determining the rate and direction of actuation of the piston and thereby the angular adjustment of the cutter blades, said servo-valve mechanism comprising a pair of relatively movable parts, one of said parts being supported for movement with the piston, a tracer stylus, and means connecting the stylus with the other of said valve parts for shifting the latter in accordance with movements of the stylus, said connecting means including a flexible power transmitting connection whereby the stylus may be independently bodily adjusted relative to the servo-valve mechanism.

4. A tracer controlled reproducing machine including a rotatable cutter body, cutter blades mounted on the body for angular adjustment relative to said body and tracer actuable means operatively connected to said blades for effecting angular adjustment thereof, said means including a shiftable piston, a cylinder for the piston, a rod connecting the piston and blades, and a servo-valve mechanism connected to the cylinder for determining the rate and direction of actuation of the piston, said servo-valve mechanism comprising a pair of relatively movable parts, one of said parts being supported for movement with the piston, a tracer stylus, and means connecting the stylus with the other of said valve parts for shifting the latter in accordance with movements of the stylus, said connecting means including a flexible power transmitting connection and a motion amplifier controlled thereby and connected to said other of the valve parts for amplifying the movement of said other valve part.

5. A reproducing machine including a work supporting table and a spindle carrier, means intervening said table and carrier mounting same for relative movement in a cutting plane, means for effecting relative contouring movements of the spindle carrier and work support in said plane, a cutter spindle rotatably supported on the carrier and having cutter blades supported for angular adjustment relative to the spindle and a cutter blade angle adjusting mechanism for automatically varying the angle of the cutter blades relative to the spindle according to the dictates of a template pattern during a contouring operation including a piston and cylinder device mounted on the spindle carrier, a piston rod operated thereby, a template pattern support on the table, a stylus bracket extending in overlying relation to the template pattern support, a pattern actuable stylus for engagement with a pattern on the pattern support movably mounted on the bracket, means supporting the bracket for movement with the spindle carrier, a hydraulic circuit operatively connected to the cylinder of the piston and cylinder device for actuation of the piston, said circuit including a two-part servo flow control valve having one part secured to the piston rod and the other part movable relative thereto, and operative connections between the stylus and said movable part for positioning the part in accordance with pattern effected movements of the stylus during said relative contouring movement of the carrier and work support.

6. A reproducing machine as specified in claim 5 in which the operative connections comprise a flexible band mechanically transmitting the stylus movement to said movable part.

7. A reproducing machine as specified in claim 5, in which the operative connections include a motor for shifting the movable part and a control device operable by the stylus for regulating the operation of the motor.

8. A reproducing machine as specified in claim 5, in which the operative connections include a hydraulic motor for shifting the movable part and a control valve operable by the stylus for regulating the operation of said hydraulic motor.

9. A reproducing machine as specified in claim 5, in which the operative connections include a motor for shifting the movable part and a control device operable by the stylus for regulating the operation of the motor, and a motion amplifier connecting the motor with said movable part.

10. A reproducing machine as specified in claim 5, in which the operative connections include a Selsyn transmitter operable by the stylus, a Selsyn receiver coupled to the transmitter, and shifting means connecting the receiver and movable part for actuation of the part by said receiver.

References Cited in the file of this patent

UNITED STATES PATENTS

| | | |
|---|---|---|
| 963,596 | Lescure | July 5, 1910 |
| 1,442,804 | Hicks | Jan. 23, 1923 |
| 2,046,386 | Kettl | July 7, 1936 |
| 2,332,532 | Roehm | Oct. 26, 1943 |
| 2,389,653 | Turchan et al. | Nov. 27, 1945 |